United States Patent [19]

Klockner et al.

[11] Patent Number: 5,094,831

[45] Date of Patent: Mar. 10, 1992

[54] PROCESS FOR THE DISMUTATION OF CHLOROSILANES

[75] Inventors: Hans-Juergen Klockner, Oakville, Canada; Peter Panster, Rodenbach; Peter Kleinschmit, Hanau, both of Fed. Rep. of Germany

[73] Assignee: Degussa Aktiengesellschaft, Frankfurt am Main, Fed. Rep. of Germany

[21] Appl. No.: 558,868

[22] Filed: Jul. 30, 1990

[30] Foreign Application Priority Data

Jul. 31, 1989 [DE] Fed. Rep. of Germany ....... 3925357

[51] Int. Cl.$^5$ ..................... C08G 77/26; C01B 33/107
[52] U.S. Cl. .................... 423/342; 423/341; 423/347; 528/38; 528/39
[58] Field of Search .......... 423/341, 342, 347; 528/38, 39

[56] References Cited

U.S. PATENT DOCUMENTS

| | | | |
|---|---|---|---|
| 2,732,282 | 1/1956 | Bailey et al. | 423/342 |
| 2,752,379 | 6/1956 | Wagner et al. | 423/342 |
| 2,834,648 | 5/1958 | Bailey et al. | 423/342 |
| 3,445,200 | 5/1969 | Dunogues et al. | 423/342 |
| 4,113,845 | 9/1978 | Litteral | 423/342 |
| 4,610,858 | 9/1986 | Yamada et al. | 423/342 |
| 4,954,599 | 9/1990 | Panster et al. | 528/38 |

FOREIGN PATENT DOCUMENTS

| | | |
|---|---|---|
| 1162028 | 2/1984 | Canada . |
| 1184017 | 3/1985 | Canada . |
| 0138669 | 9/1984 | European Pat. Off. . |
| 2507864 | 8/1975 | Fed. Rep. of Germany . |
| 2162537 | 10/1977 | Fed. Rep. of Germany . |
| 3412705 | 2/1985 | Fed. Rep. of Germany . |
| 3311650 | 11/1987 | Fed. Rep. of Germany . |

Primary Examiner—Olik Chaudhuri
Assistant Examiner—Ken Horton
Attorney, Agent, or Firm—Beveridge, DeGrandi & Weilacher

[57] ABSTRACT

A process for the dismutation of chlorosilanes is disclosed in which the latter are in the gas phase for 0.01–100 sec. at 55°–100° C. or in the liquid phase for 1–1000 sec. at 25°–55° C. conducted in the presence of a catalyst, which is either unformed or is present in the form of spherical pellets, and which consists of one of four different organopolysiloxane compounds, optionally cross-linked, which essentially carry an amino or ammonium group as a functional group.

13 Claims, No Drawings

PROCESS FOR THE DISMUTATION OF CHLOROSILANES

INTRODUCTION AND BACKGROUND

The present invention relates to a process for the dismutation of chlorosilanes, and more particularly a process for the dismutation of trichlorosilane and dichlorosilane.

Today the highest purity silicon for the semiconductor industry is almost always produced through the pyrolysis of a trichlorosilane-hydrogen mixture. In a variation, if dichlorosilane is used in place of trichlorosilane, much higher space/time yields are realized. Even the irreversible pyrolysis of monochlorosilane permits the production of high purity silicon with high space/time yields.

Dichlorosilane can also be used in organosilane chemistry for the production of diorganohalogen silanes of the type $R_2SiCl_2$ through double hydrosilylization. Linear organopolysiloxanes may be obtained through chain extension reaction with these diorganosilanes, or, in the presence of functional groups in the organo-residue, three-dimensional, cross-linked polymers may be obtained through chain cross-linking reactions.

The dismutation of chlorosilane presents an especially favorable way to obtain dichlorosilane and monosilanes. Dichlorosilane is obtained through dismutation of trichlorosilane in the presence of a catalyst according to the following equation:

$$2SiHCl_3 \rightleftharpoons SiH_2Cl_2 + SiCl_4.$$

Monosilane may be obtained catalytically through dismutation of dichlorosilane according to the following equation:

$$3SiH_2Cl_2 \rightleftharpoons SiH_4 + 2SiHCl_3.$$

Both reactions are equilibrium reactions; with an infinite reaction time an equilibrium occurs which depends only on temperature and the partial pressures of the reactants.

A large number of processes for the dismutation of chlorosilanes have been described in which the reaction was performed in the presence of a catalyst which is soluble in the chlorosilanes. It is also possible to perform the dismutation in a reaction medium which is miscible with the chlorosilanes and in which the catalyst is dissolved. But all these processes are noted for the disadvantages of the expensive and often difficult separation problems.

Therefore the art has used heterogenous catalysts which are insoluble in the chlorhydrosilicons. In Canadian Patent 1 184 017, Canadian Patent 1 162 028, German Patent 33 11 650, German Patent 25 07 864 and German Patent 21 62 537, for instance, the use of a slightly alkaline ion exchanger, AMBERLYST® A-21, is described, in which dimethylamino groups are bonded to a polystyrene structure. In European Patent A-206 621 the reaction product of tri-n-butylamine with the ion exchanger LEWATIT® SPC-118 is mentioned as a catalyst. The German Offenlegungsschrift 34 12 705 describes the use of a slightly alkaline anion exchanger with an aromatic heterocyclic base as a functional group.

The Japanese Patent 60/77120 A2 mentions the ion exchanger DUOLITE® ES-467 which contains amino and phosphoric acid groups for this purpose. DOE/JPL/955533-83/7 suggests the methylamine group-containing anion exchanger DOWEX® MWA-1 for this purpose. Finally, the European Patent A-138 669 also mentions alkaline ion exchange resins as catalysts.

All of these described processes agree in that ion exchangers based on organic polymers are used as heterogenous catalysts for the dismutation of chlorosilanes. However, these organic polymers do not have in any way ideal properties in regard to thermal and mechanical stability, inertness to chemical actions, accessibility of functional groups and solubility in the solvent used. Problems may therefore occur because either the organic matrix is not pressure- or temperature-resistant to the required extent or swells too much in the reaction medium used, is partially dissolved, or sticks together, or the functional groups are insufficiently or not at all accessible, or a relatively fast aminoseparation takes place.

It is the task of the invention to find catalysts for the chlorosilane dismutation reaction which do not have the disadvantages of the organic ion exchangers described above, and to create a suitable dismutation process using these catalysts.

SUMMARY OF THE INVENTION

According to the invention this task is solved by using polymeric organosiloxane amine and organosiloxane ammonium compounds in pure form or as copolycondensates for the chlorosilane dismutation reaction that possess properties such as stable structure, non-swelling, high thermal stability, insolubility and good access of the functional groups and have no tendency for amine separation. These polymers may be used either formed or unformed in the gas or liquid phase.

Accordingly, the subject of the invention is therefore a process for the dismutation of chlorosilanes, in particular trichlorosilane and dichlorosilane, which features using the chlorosilanes in the gas or liquid phase at a temperature between 55°–100° C. in the gas phase and between 25°–55° C. in the liquid phase, or, if under pressure, up to 100° C. in the liquid phase. The reaction is conducted for 0.01–100, preferably 1–10 sec. in the gas phase and 1–1000, preferably 1–550 sec. in the liquid phase, in the pressure range from 1–10 bar absolute, in the presence of the catalyst. The latter is either unformed or unshaped, i.e. is present in solid pieces or as a powder, or is a shaped catalyst which is present in the form of spherical pellets, and consists of one of the following organopolysiloxanes which carry an amino or ammonium group as a functional group and have the compositions A)–D):

A) tertiary or secondary polyorganosiloxane amines which may be cross-linked with cross-linking agents containing Si, Ti, and/or Al, and which amines have the formula:

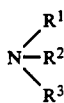

wherein $R^1$ and $R^2$ are

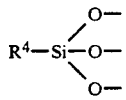

wherein R⁴ is alkylene with $C_1-C_{10}$, cycloalkylene with $C_5-C_8$, or

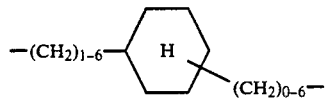

or

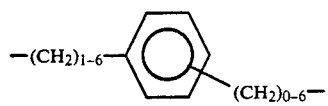

$R^3$ is $R^1$ or $R^2$, H, alkyl with $C_1-C_{10}$, cycloalkyl with $C_5-C_8$ or benzyl;

B) Organosiloxane amine copolycondensates which may be cross-linked with cross-linkers containing Si, Ti, Zr and/or Al and which consist of the units

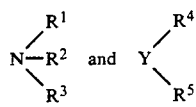

wherein $R^1$ to $R^5$ are

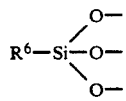

wherein $R^6$ is bonded directly to N or Y and is alkylene with $C_1-C_{10}$, cycloalkylene with $C_5-C_8$ or

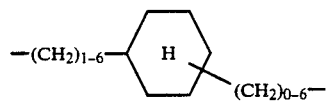

or

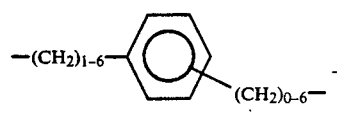

wherein Y is

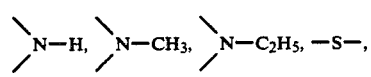

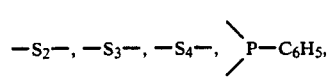

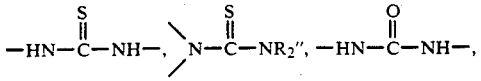

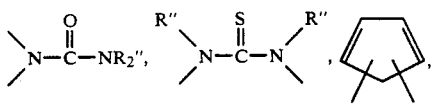

wherein R″ is H or alkyl with $C_1-C_5$;

C) Organosiloxane amine copolycondensates which may be cross-linked with cross-linkers containing Si, Ti, Zr and/or Al and which consist of the units

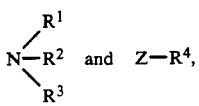

wherein $R^1$ to $R^4$ are

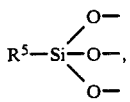

wherein $R^5$ is bonded directly to N or Z, and is alkylene of $C_1-C_{10}$, cycloalkylene of $C_5-C_8$ or

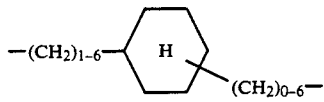

or

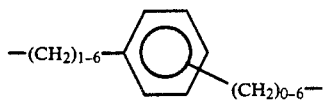

and Z is

—NH₂, —NH—(CH₂)₂—NH₂, —N(CH₃)₂, —N(C₂H₅)₂,

—NH—(CH₂)₂—NH—(CH₂)₂—NH₂, —Cl, —Br,

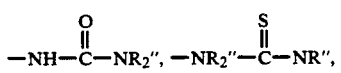

—O—C(=O)—C(CH₃)=CH₂, wherein R″ is H or alkyl of $C_1-C_5$;

D) Polymeric ammonium compounds which may be cross-linked with cross-linking agents containing Si, Ti, and/or Al and which have the formula $$\left[ \begin{array}{c} R^1 \diagdown \diagup R^2 \\ \phantom{R}\overset{+}{N}\phantom{R} \\ R^4 \diagup \diagdown R^3 \end{array} \right]_x X^{x-}$$

wherein $R^1$ and $R^2$ are $$R^5-Si \begin{array}{c} -O- \\ -O- \\ -O- \end{array},$$

wherein $R^5$ is alkylene of $C_1-C_{10}$, cycloalkylene of $C_5-C_8$ or $-(CH_2)_{1-6}-\langle\text{C}_6\text{H}_{10}\rangle-(CH_2)_{0-6}-$ or $-(CH_2)_{1-6}-\langle\text{C}_6\text{H}_5\rangle-(CH_2)_{0-6}-$ $R^3$ and/or $R^4$ is $R^1$ and $R^2$ or H, alkyl of $C_1-C_{20}$, cycloalkyl of $C_5-C_8$ or benzyl X is a 1- to 3-valent anion.

In a preferred aspect of the invention, the catalyst is either

Type A) as a tertiary polymer amine consisting of the units $N(CH_2-CH_2-CH_2SiO_{3/2})_3$ or Type B as a statistical copolycondensate, block-copolycondensate, or as a mixture of these with a ratio $$N \begin{array}{c} R^1 \\ -R^2: Z \\ R^3 \end{array} \begin{array}{c} R^4 \\ R^5 \end{array} = 0.01:99.99 \text{ to } 99.99:0.01 \text{ Mol \%}$$

or

Type C) as a statistical copolycondensate, block-copolycondensate, or as a mixture of them with a ratio $$N \begin{array}{c} R^1 \\ -R^2: Z-R^4 \\ R^3 \end{array} = 0.01:99.99 \text{ to } 99.99:0.01 \text{ Mol \%}$$

or

Type D) as a polymer ammonium compound consisting of the units $[CH_3C)n(CH_2CH_2CH_2SiO_{3/2})_3]^+Cl^-$.

or of the units $[(N(CH_2CH_2CH_2SiO_{3/2})_4]^+Cl^-$.

According to a more detailed aspect of the invention types A) to D) catalysts consist of pieces or powder with the following properties:

a specific surface of 0.1–3000 m²/g and a particle diameter of 1 cm–1 μm for type A), a specific surface of 0.1–1000 m²/g and a particle diameter of 1 cm–1 μm for types B) and C), and a specific surface of 0.1–2000 m²/g and a particle diameter of 1 cm–1 μm, preferably between 0.1 to 1.5 mm, for type D).

According to a further detailed aspect of the invention the pellet-shaped types A) to D) catalysts used have the following properties:

Type A) as macroscopically pellet-shaped particles with a diameter from 0.01–3.0 mm, a specific surface of 0.1–1000 m²/g, a specific pore volume of 0–6.0 ml/g, as well as a powder density from 50–1000 g/l;

Types B) and C) as macroscopically pellet-shaped particles with a diameter from 0.01–3.0 mm, preferably from 0.1–2.0 mm, a specific surface from 0.1–1000 m²/g, preferably up to 0–700 m²/g, a specific pore volume of 0–6.0 ml/g, as well as a powder density from 50–1000, preferably from 100–800 g/l;

Type D) as macroscopically pellet-shaped particles with a diameter from 0.01–3.0 mm, a specific surface of 0.1–1000 m²/g, a specific pore volume of 0–5.0 ml/g, a powder density from 50–1000 g/l and a volume-specific dry substance of 50–750 g/l.

The catalysts referred to herein are in regard to their compositions and availabilities described in detail in the following German patents and patent applications of the applicant:

Type A) unformed: P 31 20 214 of 21 May 1981 corresponding to U.S. application Ser. No. 376,882.

Type A) formed: P 38 00 563 of 12 Jan. 1989 corresponding to U.S. application Ser. No. 295,886.

Type B) unformed: P 38 37 418 of 4 Nov. 1988 corresponding to U.S. application Ser. No. 431,218.

Type B) formed: P 39 25 359.7 of 31 July 1989 corresponding to U.S. application Ser. No. 556,486.

Type C) unformed: P 38 37 416 of 4 Nov. 1988 corresponding to U.S. application Ser. No. 431,220.

Type C) formed: P 39 25 360.0 of July 31, 1989 corresponding to U.S. application Ser. No. 556,720.

Type D) unformed: P 31 20 195 of May 21, 1981 corresponding to U.S. application Ser. No. 376,881.

Type D) formed: P 38 00 564 of Jan. 12, 1988 corresponding to U.S. application Ser. No. 295,893.

Express reference is made to the contents of these patent applications for supplementary description of the catalyst materials and their production which are incorporated herein.

In general the following uses which were significant within the context of this invention were known for the individual catalyst types at the time of publication of these applications.

For type A): removal of acids from liquids and gases;

For type B): removal of dissolved metals from liquid, aqueous or organic phase according to the static or dynamic principle;

For type C): removal of dissolved metals from liquid, aqueous, or organic phase according to the static or dynamic principle;

For type D): ion exchange or removal of metal ions from solutions.

Chlorosilanes may be dismutated by means of these polyorganosiloxane materials with high space/time yield, in the liquid as well as in the gas phase. For instance, trichlorosilane may be dismutated to dichlorosilane, and silicon tetrachloride and dichlorosilane to monosilane, monochlorosilane, and trichlorosilane.

DETAILED EMBODIMENTS
EXAMPLES

The following catalysts based on polyorganosiloxane were used in dried form; and AMBERLYST®A-21 was used as a control catalyst:

| Name | Formula |
|---|---|
| I | $N[(CH_2)_3SiO_{3/2}]_3$ (type A) |
| II | $N[(CH_2)_3SiO_{3/2}]_3 \cdot SiO_2$ (type A, cross-linked) |
| III | $HN[(CH_2)_3SiO_{3/2}]_2 \cdot 0,2\ N[(CH_2)_3SiO_{3/2}]_3 \cdot SiO_2$ (type B, cross-linked) |
| IV | $[H_2N-(CH_2)_2-NH-(CH_2)_2-NH-(CH_2)_3SiO_{3/2}] \cdot N[(CH_2)_3-SiO_{3/2}]_3$ (type C) |
| V | $\{(H_3C)N[(CH_2)_3SiO_{3/2}]_3\}^+Cl^-$ (type D) |
| VI | $H_2N-(CH_2)_3SiO_{3/2} \cdot N[(CH_2)_3SiO_{3/2}]_3$ (type C) |
| Amberlyst A-21 | polystyrene structure $N(CH_3)_2$ |

Each catalyst was filled into a thermally controlled tube of 1.4 cm diameter with a powder height of 22 cm each. Pressures were between 1 and 10 bar absolute. The added amount of chlorosilane was measured and the obtained product spectrum was determined with gas-chromatography. The results are shown in the following table.

Further variations and modifications will be apparent to those skilled in the art from the foregoing and are intended to be encompassed by the claims appended hereto.

German priority document P 39 25 357.0 is relied on and incorporated herein by reference.

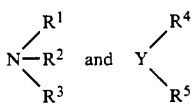

wherein $R^1$ to $R^5$ are

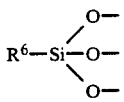

wherein $R^6$ = alkylene with $C_1$–$C_{10}$, cycloalkylene with $C_5$–$C_8$ or

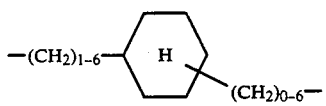

or

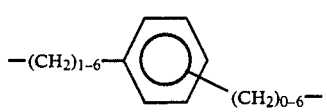

bonded directly to N or Y,

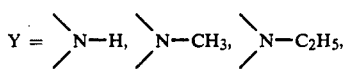

| example | catalyst | chloro silane | chlorosilane dosage (g/min) | catalyst temp- erature | chlorosilane phase in catalyst | pressure (bar absol.) | time in catalyst | product composition (mol %) | | | | |
|---|---|---|---|---|---|---|---|---|---|---|---|---|
| | | | | | | | | $SiCl_4$ | $SiHCl_3$ | $SiH_2Cl_2$ | $SiH_3Cl$ | $SiH_4$ |
| 1 | I | $SiHCl_3$ | 18 | 60° C. | gas phase | 1 | 0.6 | 13 | 77 | 9 | 1 | — |
| 2 | II | $SiHCl_3$ | 3.8 | 60° C. | gas phase | 1 | 2.8 | 13 | 77 | 9 | 1 | — |
| 3 | III | $SiHCl_3$ | 7.7 | 60° C. | gas phase | 5 | 7.0 | 9 | 83 | 7 | 1 | — |
| 4 | IV | $SiHCl_3$ | 1.8 | 60° C. | gas phase | 1 | 5.9 | 13 | 77 | 9 | 1 | — |
| 5 | V | $SiHCl_3$ | 3.5 | 60° C. | gas phase | 1 | 3.0 | 15 | 76 | 8 | 1 | — |
| 6 | VI | $SiHCl_3$ | 10.0 | 100° C. | gas phase | 1 | 1.1 | 11 | 80 | 8 | 1 | — |
| 7 | Amberlyst A-21 | $SiHCl_3$ | 3.7 | 60° C. | gas phase | 1 | 2.8 | 13 | 78 | 8 | 1 | — |
| 8 | IV | $SiHCl_3$ | 5.3 | 25° C. | liquid phase | 1 | 530 | 6 | 92 | 3 | 1 | — |
| — | balance conditions(+) | $SiHCl_3$ | — | 60° C. | — | 1 | >$10^4$ | 9.1 | 81 | 9.8 | 0.4 | — |
| 9 | IV | $SiH_2Cl_2$ | 1.4 | 60° C. | gas phase | 1 | 6.7 | 0.2 | 33 | 45 | 16 | 5 |
| 10 | I | $SiH_2Cl_2$ | 1.8 | 60° C. | gas phase | 1 | 5.2 | 0.5 | 40 | 39 | 12 | 9 |
| 11 | IV | $SiH_2Cl_2$ | 18.7 | 80° C. | gas phase | 10 | 5.0 | 0.2 | 38 | 42 | 12 | 8 |
| — | balance conditions(+) | $SiH_2Cl_2$ | — | 60° C. | — | 1 | >$10^4$ | 0.3 | 32.6 | 39 | 16 | 11.6 |

(+) according to literature DOE/JPL/954 334-10, p. 187

We claim:
1. A process for the dismutation of chlorosilanes comprising contacting a chlorosilane with a catalyst, said chlorosilane being in the gas phase or liquid phase, said catalyst being at least one of the following organo-polysiloxanes which carry an amino or ammonium group as a functional group and have the compositions B-D:
   B) organosiloxane amine copolycondensates which are optionally cross-linked with cross-linking agents containing Si, Ti, Zr and/or Al and which consist of the units

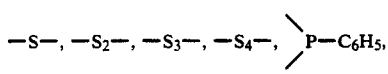

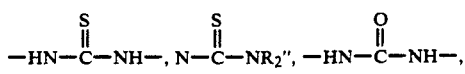

-continued

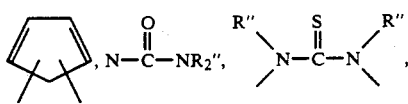

wherein R″=H or alkyl with $C_1$-$C_5$;

C) organosiloxane amine copolycondensates which are optionally cross-linked with cross-linkers containing Si, Ti, Zr and/or Al and which consist of the units

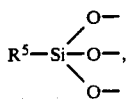

wherein $R^1$ to $R^4$ are

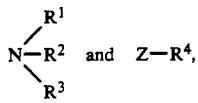

wherein $R^5$=alkylene of $C_1$-$C_{10}$, cycloalkylene of $C_5$-$C_8$ or

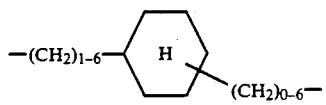

or

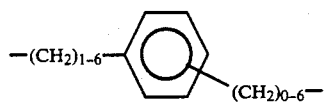

bonded directly to N or Z, $Z = -NH_2, -NH-(CH_2)_2-NH_2, -N(CH_3)_2,$ $-N(C_1H_5)_2, -NH-(CH_2)_2-NH-(CH_2)_2-NH_2,$ $-Cl, -Br, -I, SH, -P(C_6H_5)_2, -NH-\overset{S}{\underset{\|}{C}}-NR_2″,$ $-NH-\overset{O}{\underset{\|}{C}}-NR_2″, -NR_2″-\overset{S}{\underset{\|}{C}}-NR″,$

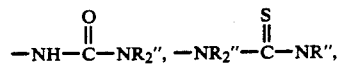

wherein R″ is H or alkyl of $C_1$-$C_5$;

D) polymeric ammonium compounds which are optionally cross-linked with cross-linking agents containing Si, Ti, and/or Al and which have the formula

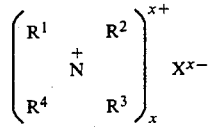

wherein

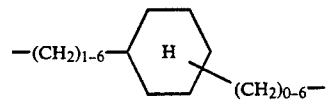

wherein $R^5$=alkylene of $C_1$-$C_{10}$, cycloalkylene of $C_5$-$C_8$ or

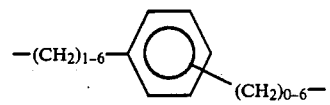

or

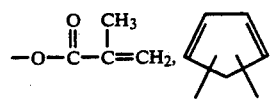

$R^3$ and/or $R^4$ is $R^1$ and $R^2$ or H, alkyl of $C_1$-$C_{20}$, cycloalkyl of $C_5$-$C_8$ or benzyl X is a 1- to 3-valent anion and x can be a number from 1 to 3.

2. The process for the dismutation of chlorosilane according to claim 1 wherein said chlorosilane is in the gas phase, the temperature is 55°-100° C., the time is 0.01 to 100 seconds at a pressure of 1-10 bar absolute.

3. The process for dismutation of chlorosilane according to claim 1 wherein said chlorosilane is in the liquid phase, the temperature is 25°-55° C., the time is 1-1000 seconds at a pressure of 1-10 bar absolute.

4. The process for the dismutation of chlorosilane according to claim 1 wherein said chlorosilane is in the liquid phase and is under pressure, at a temperature of up to 100° C.

5. The process for the dismutation of chlorosilane according to claim 2 wherein the time is 1-10 seconds.

6. The process for the dismutation of chlorosilane according to claim 3 wherein the time is 1-550 seconds.

7. The process for the dismutation of chlorosilane according to claim 1 wherein the catalyst is present in the form of pieces, powder or shaped spherical pellets.

8. The process according to claim 1 wherein the catalyst is either

Type B) as a statistical copolycondensate, block-copolycondensate, or as a mixture of these with a ratio

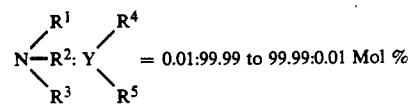

or

Type C) as a statistical copolycondensate, block-copolycondensate, or as a mixture of them with a ratio

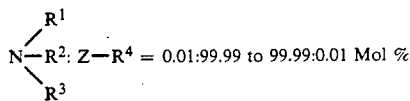

or

Type D) as a polymer ammonium compound consisting of the units $((CH_3C)_n(CH_2CH_2CH_2SiO_{3/2})_3)^+Cl^-$ or of the units $((N(CH_2CH_2CH_2SiO_{3/2})_4)^{+Cl-}$.

9. The process according to claim 1, wherein types B) to D) catalysts consist of pieces or powder with the following properties:
   a specific surface area of 0.1–1000 m²/g and a particle diameter of 1 cm–1 μm for types B) and C), and
   a specific surface area of 0.1–2000 m²/g and a particle diameter of 1 cm–1 μm, for type D).

10. The process according to claim 9 wherein the type D has a particle diameter of 0.1 to 1.5 mm.

11. The process according to claim 1 wherein pellet-shaped types B) to D) have the following properties:
    Types B) and C) as macroscopically pellet-shaped particles with a diameter from 0.01–3.0 mm, a specific surface area from 0.1–1000 m²/g, a specific pore volume of 0–6.0 mL/g, as well as a powder density from 50–1000 g/L;
    Type D) as macroscopically pellet-shaped particles with a diameter from 0.01–3.0 mm, a specific surface area from 0.1–1000, m²/g, a specific pore volume of 0–5.0 ml/g, as well as a powder density from 50–1000 g/l and a volume-specific dry substance of 50–750 g/l.

12. The process according to claim 11 wherein Types B) and C) are macroscopically pellet-shaped with a diameter of 0.1–2.0 mm, a specific surface area of up to 700 m²/g and a density of 100–800 g/l.

13. A process for the dismutation of chlorosilanes comprising contacting a chlorosilane with a catalyst, said chlorosilane being in the gas phase or liquid phase, said catalyst being the following organopolysiloxanes which carry an amino or ammonium group as a functional group and have the composition A:
    A) tertiary or secondary polyorganosiloxane amines which are optionally cross-linked with cross-linking agents containing Si, Ti, and/or Al, and which amines have the formula:

wherein $R^1$ and $R^2$ are

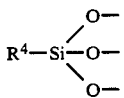

wherein $R^4$ is alkylene with $C_1$–$C_{10}$, cycloalkylene with $C_5$–$C_8$, or

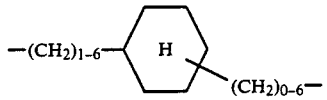

or

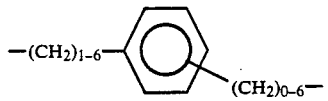

$R^3$ is $R^1$ or $R^2$, H, alkyl with $C_1$–$C_{10}$, cycloalkyl with $C_5$–$C_8$ or benzyl.

* * * * *